Patented Feb. 4, 1941

2,230,909

UNITED STATES PATENT OFFICE 2,230,909

PROCESS OF MAKING ALKALI SUBSILICATES

Walter S. Riggs, Haddon Heights, N. J., and Clarence W. Burkhart, Lansdowne, Pa., assignors to Pennsylvania Salt Manufacturing Company, Philadelphia, Pa., a corporation of Pennsylvania No Drawing. Application September 17, 1936, Serial No. 101,322

20 Claims. (Cl. 23—110)

Our invention relates to a novel process of manufacturing soluble alkali silicates and, more particularly, it relates to an economic process for the production of alkali sub-silicates, with an alkali content not less than the silica content, by the direct reaction of caustic alkali, and a solid water-glass, without the dissolution or the fusion of either of the reactants.

One object of the present invention is to provide a method by which the various soluble alkali silicates may be easily and economically manufactured without resort to the expensive equipment and laborious steps required in processes previously employed in the production of these compounds.

A further object of the invention is to furnish a process of making alkali sub-silicates by the reaction of solid caustic soda with powdered water-glass, in contradistinction to the previous processes where the recovery of the sub-silicates from a solution is required.

Still another object is to provide a process by which granular or pulverulent soluble alkali silicates may be obtained in a free-flowing marketable form without the necessity of expending energy and time in grinding or comminuting the product to useful size.

Still another object is to provide a process for the manufacture of high-grade, free-flowing, stable alkali silicates of low hydration, and of any desired ratio of alkali to silica, from 1 to 1 upwards; for example, metasilicate, the sesquisilicate, the orthosilicate or mixtures thereof, as contrasted with the variety of silicate products now available on the market that contain large and varying percentages of water of crystallization.

Other objects will be apparent from a consideration of the specification and claims.

The processes heretofore employed in the production of alkali silicates, whose alkali content is not less than the silica content, known, and referred to herein, as alkali subsilicates, have been time-consuming, laborious, and expensive, and have required the use of expensive equipment. The sub-silicates have previously been manufactured by methods involving the concentration of solutions, the removal of the alkali subsilicates therefrom by crystallization, and the comminution and drying of the crystals. For example, silica or water-glass is rendered soluble by digestion with a concentrated solution of caustic alkali, and the solution is evaporated and cooled to a suitable crystallization temperature. It is then seeded, agitated, and cooled to remove therefrom the heat generated by the crystallization. The crystals are removed, comminuted, and dried. It is obvious that in this type of process, the evaporation costs are high, the layout of the plant is extensive, and the necessary digester equipment is expensive.

The process of the present invention is a marked departure from the previous processes, since in accordance therewith, solid caustic soda and solid water-glass are reacted directly by mixing at a temperature below the melting point of the caustic alkali. The reaction may be carried out in a simple apparatus, such as a suitable externally heated mixing device to insure agitation of the mass during the reaction. The product from the mixer is available for use in the trade and is a hydrated sub-silicate. A product of improved appearance and of very low hydration may be obtained by a so-called "dressing" process, in which the product from the mixer is heated at a somewhat elevated temperature, but below the melting point of the silicate. This product is designated herein as a technically anhydrous material, although it may contain a fraction of one molecule of water of crystallization. The process in the mixer can be completed in less than 10–15 minutes, and the total time required in producing the technically anhydrous product may be less than one hour.

It will be seen that the process of the present invention eliminates the difficulties and expense of the methods previously employed in the manufacture of alkali sub-silicates. The present process avoids the multiple adjustments and readjustments of composition, hydration and concentration, as well as the seeding, crystallization, separation of the crystals, and the drying.

The process of the present invention is applicable for the production of alkali silicates corresponding to any desired ratio of alkali to silica where the alkali oxide content is equal to or greater than the silicon dioxide content. For example, a silicate corresponding to the metasilicate, the sesquisilicate, the orthosilicate, or mixtures thereof may be formed by mixing the desired ratio of ingredients.

The caustic alkali (sodium hydroxide or potassium hydroxide) may be added to the mixer either in a ground or flake condition. The term "water glass" employed herein includes those alkali silicates where the acidic constituent $SiO_2$ is greater than the alkali constituent $Na_2O$ or $K_2O$. The process involves the conversion of a silicate containing an excess of $SiO_2$ over the 1 to 1 molecular ratio into one containing an excess of the alkali. Since the sodium silicates are more commercially important at the present time, the invention will be described using the solid caustic soda and solid sodium water glass as reactants. The water glass in the solid form may either be obtained by crystallization, in which case the product is hydrated or by the usual fusion furnace process. The furnace-fused products may be technically anhydrous, or if they have been specially treated to render them soluble in hot water, they may contain some water, for example, up to 20%. These latter products are more reactive in the process of the invention and, therefore, may be advantageously employed therein, particularly in the production of the metasilicate. The product may contain any ratio of $SiO_2$ to $Na_2O$ where the former exceeds the latter and, in general, the ratio is between 1.5 to 3.8 mols of $SiO_2$ to 1.0 mol of $Na_2O$. At the present time, two varieties of solid water glass are commercially important, one containing 2.0 mols of $SiO_2$ to 1.0 mol of $Na_2O$, and the other containing 3.3 mols $SiO_2$ to 1.0 mol of $Na_2O$. These products, therefore, may be used to advantage. With the use of any particular water glass, the amount of solid caustic soda employed therewith is determined by the type of sodium sub-silicate desired, and the $Na_2O$ of the water glass is taken into consideration in figuring the amount of caustic soda to be added. Thus, the equation for the production of sodium orthosilicate may be expressed as follows:

$$Na_2O \cdot 2SiO_2 + 6NaOH = 2(2Na_2O \cdot SiO_2) + 3H_2O$$

If the ratio of $Na_2O$ to $SiO_2$ is 2 to 1, a silicate is formed, after the reaction in the mixer, which is from 95% to 100% soluble, depending upon the water glass employed. The ratio of the two oxides in the compound corresponds to the orthosilicate and a substantially pure technically anhydrous orthosilicate ($Na_4SiO_4$) is obtained when the product of the mixer is subjected to the dressing step. When the ratio of $Na_2O$ to $SiO_2$ is 1.5 to 1, a compound is formed in the mixer in which the ratio of $Na_2O$ to $SiO_2$ corresponds to the sesquisilicate. After dressing, a technically anhydrous sesquisilicate ($Na_6Si_2O_7$) is obtained. If a sodium metasilicate is desired, this may be obtained by reacting a solid water glass which is completely soluble in hot water, for example the crystallized water glass or a water glass resulting from the special treatment of the fused furnace products, with the solid caustic soda in the ratio of 1 mol of $SiO_2$ to 1 mol of $Na_2O$. If a technically anhydrous product is desired, the reaction product is dressed. If a water glass is employed which is not soluble in hot water, a so-called base product may be formed by reacting the water glass and caustic soda in the ratio of 1.25 mols of $SiO_2$ to 1 mol of $Na_2O$. After this product has been treated to render it technically anhydrous, it may be treated with a water glass solution of suitable composition to bring the ratio of $Na_2O$ to $SiO_2$ to a metasilicate hydrate which can be converted to the anhydrous product by further dressing, for example at 200° C. It will also be clear that if products containing other ratios of alkali oxide to silicon dioxide are desired, the amounts of reactants added to the mixer may be adjusted accordingly. Thus mixtures of the various sub-silicates, or mixtures of sub-silicates and alkali, may be obtained.

As previously stated, the reaction takes place between the solid caustic soda and subdivided solid water glass. The fineness of the water glass determines to some extent the rate of reaction and may advantageously be 100-mesh. Coarser material may, for example, be employed without increasing the reaction time materially if one of the relatively reactive water glasses is employed in the production of the various sub-silicates, or if sodium orthosilicate is to be produced. Material finer than 100-mesh may also be used if desired. The reaction proceeds satisfactorily by dry-mixing the ingredients, but, if desired, a small amount of water, insufficient to dissolve the reactants, may be added to lubricate the mixture and to protect the apparatus. If water is added, it will in general not exceed 6%–7% of the total weight of the water glass and caustic soda.

The mixing device in which the reaction between the caustic soda and water glass is brought about is preferably heated to cause completion of the reaction in a relatively short time. In the case a technically anhydrous water glass is reacted, a temperature of the reacting ingredients of about 150° C., or higher, will bring about the reaction in a very short time. When a temperature of about 150° C. is reached in the reacting mass, the temperature rises to from 175° C. to 225° C. due to the heat liberated by the reaction. Temperatures higher than this may be employed, if desired, as long as the point of fusion of the caustic soda is not reached. In general, the temperature of the mixture of the materials employed will be between 150° C. and 250° C. When a specially treated furnace-fused product is used, gentle heating will cause the reaction with an accompanying temperature rise to about 100° C.

As previously pointed out, the mixtures of the caustic soda and the water glass particles is preferably agitated during the heating. When a water glass which is not readily soluble in hot water, i. e. technically anhydrous, is used, the mass, due to the reaction, is converted into a viscous, flowable material which in a very short time becomes a plastic mass. When the more reactive types of water glass are employed, the material does not pass through this definitely plastic stage, but at first becomes wet and tends to agglomerate. Upon further agitation, a pulverulent product results. With technically anhydrous water glass, when the temperature is reached where the reaction becomes noticeably exothermic, at least the water added, if any, is liberated as steam. The plastic mass, if formed, soon solidifies and, due to the mechanical action of the mixer, a granular or pulverulent free-flowing product is obtained. The product is suitable for use by the trade and, when a technically anhydrous water glass is employed, it corresponds substantially to a silicate monohydrate containing free caustic alkali, depending on the ratio of materials used.

If desired, in order to improve the appearance and quality of the product, the granular material of the mixer may be dressed by further heating it at a somewhat higher temperature, care being taken not to approach the melting point of the product. Usually a temperature between 300° C. and 600° C. will be employed and excellent results are obtained when a temperature in the neighborhood of 450° C. is used. A rotary drier heated indirectly by any suitable source of fuel is applicable for this treatment and a carbon-dioxide-free atmosphere may be maintained therein if an especially pure product is desired. A technically anhydrous, free-flowing, white granular or powdered product is obtained after heat-treatment in, for example, thirty to sixty minutes.

In a typical case, in the production of sodium orthosilicate, 57 parts of technically anhydrous water glass having a $Na_2O$ to $SiO_2$ ratio of 1 to 3.3, preferably in powdered form, is added to the heated mixer, while in operation, with 100 parts of ground caustic soda and, if desired, 10 parts of water. A few minutes thereafter, for example five or six minutes, the mixture reaches a temperature of about 150° C., at which time the reaction product is a viscous, flowable mass. In an additional two or three minutes a vigorous reaction takes place and the temperature rises from 150° C. to 220–225° C. and steam is liberated, particularly in the case where water is added. A dry, friable mass or powder approaching the orthosilicate in composition is formed shortly thereafter. This product is stable, free-flowing, and practically totally soluble, and can be used commercially. If a technically anhydrous product is desired, the pulverulent product from the mixer is heated in a suitable drier at temperatures from 300° C. to 600° C., preferably in the neighborhood of 450° C. This results in 135 parts of a substantially anhydrous, free-flowing solid which is soluble in water and available for all technical uses.

If a sesquisilicate is desired, 57 parts of subdivided technically anhydrous water glass of the 1 to 3.3 type are heated in the mixer with 70 parts of ground caustic soda, and if desired 10 parts of water, and the process conducted as outlined in the foregoing example. After treatment in the drier, 112 parts of technically anhydrous sodium sesquisilicate results in the form of a free-flowing powder.

A product may be manufactured by mixing 80.7 parts of ground technically anhydrous water glass of the 1 to 3.3 type with 81.5 parts of ground caustic soda, and if desired 10 parts of water. The process is conducted as outlined in the example describing the production of the orthosilicate. The product obtained is designated as a so-called base product and is available for use in the trade as obtained from the mixer or after treatment in the drier to furnish a technically anhydrous product. If a compound corresponding to a metasilicate is desired, the dressed product from the drier is treated with the necessary amount of water glass solution of suitable composition to bring the ratio of alkali oxide to silica to that corresponding to a metasilicate. The treatment with the water glass solution is preferably carried out in a blending mixer in order to insure thorough mixing. The granular product may be marketed for technical uses or passed through a drier heated in the neighborhood of 200° C. to form a technically anhydrous product.

If it is desired to produce a metasilicate directly, 100 parts of the specially treated water glass of the 1 to 3.3 type containing 17½% water are mixed with 60 parts of ground caustic soda and, if desired, 10 parts of water. The process is conducted, in general, as outlined in the example relating to the production of the orthosilicate, although the reaction proceeds satisfactorily when the reacting mass is heated gently, allowing it to rise to about 100° C. In this case as previously pointed out, the reacting mass does not pass through the definitely plastic stage. If a technically anhydrous metasilicate is desired, it may be obtained by dressing the product as described.

If the silicates produced in accordance with the process of the reaction are to be used as detergents, it may be desirable to incorporate other materials possessing somewhat similar properties with the silicates, for example, trisodium phosphate, disodium phosphate, and sodium carbonate. The materials may be incorporated with the silicates at any desired point in the process, depending upon the nature and chemical properties of the materials included.

While in this specification, there is described a process of converting a subsilicate of higher ratio of alkali oxide to silicon dioxide to one of a lower ratio by reaction of the sub-silicate with a compound of the type of water glass, no claims directed to this process are made herein, since such invention is described and claimed in our co-pending application Serial No. 131,748, filed March 18, 1937, as a continuation-in-part hereof (now Patent No. 2,175,781).

Considerable modification is possible in the proportions of caustic alkali and water glass employed, as well as in the physical factors used in the various steps of the process without departing from the essential features of the invention.

We claim:

1. The process of preparing a solid alkali subsilicate which comprises mixing together solid subdivided caustic alkali and solid subdivided alkali silicate containing a ratio of $SiO_2$ to alkali oxide greater than 1 to 1, in such molecular proportions that the alkali oxide content of the mixture is not less than the $SiO_2$ content, and in the absence of water exceeding 7% of the total weight of the alkali silicate and caustic alkali; and heating the mixture to a temperature below the fusion point of said caustic alkali and of said alkali silicate sufficient to cause the reaction between the caustic alkali and alkali silicate to form in a short time a sub-silicate.

2. The process of preparing a solid alkali subsilicate which comprises mixing together solid subdivided caustic alkali and solid subdivided alkali slicate containing a ratio of $SiO_2$ to alkali oxide greater than 1 to 1, in such molecular proportions that the alkali oxide content of the mixture is greater than the $SiO_2$ content, and in the absence of water exceeding 7% of the total weight of the alkali silicate and caustic alkali; and heating the mixture to a temperature below the fusion point of said caustic alkali and of said alkali silicate, while stirring, sufficient to cause a vigorous reaction between the caustic alkali and alkali silicate and the liberation of sufficient water to form in a short time a sub-silicate, the water content of which does not substantially exceed that of a monohydrate.

3. The process of claim 2 wherein the caustic alkali is caustic soda and the alkali silicate is technically anhydrous sodium silicate, and wherein the temperature is above about 150° C.

4. The process of preparing a solid alkali subsilicate which comprises mixing together solid subdivided caustic alkali and solid subdivided alkali silicate containing a ratio of $SiO_2$ to alkali oxide greater than 1 to 1, in such molecular proportions that the alkali oxide content of the mixture is greater than the $SiO_2$ content, and in the absence of an appreciable amount of water; and heating the mixture to a temperature below the fusion point of said caustic alkali and of said alkali silicate, while stirring, sufficient to cause a vigorous reaction between the caustic alkali and alkali silicate and the liberation of sufficient water to form in a short time a sub-silicate, the water content of which does not substantially exceed that of a monohydrate.

5. The process of claim 4 wherein the caustic alkali is caustic soda and the alkali silicate is technically anhydrous sodium silicate, and wherein the temperature is above about 150° C.

6. The process of preparing a solid alkali sub-silicate which comprises mixing together solid subdivided caustic alkali and solid subdivided alkali silicate containing a ratio of $SiO_2$ to alkali oxide greater than 1 to 1, in such molecular proportions that the alkali oxide content of the mixture is greater than the $SiO_2$ content, and in the absence of water; and heating the mixture to a temperature below the fusion point of said caustic alkali and of said alkali silicate, while stirring, sufficient to cause a vigorous reaction between the caustic alkali and alkali silicate to form in a short time a sub-silicate.

7. The process of claim 6 wherein the caustic alkali is caustic soda and the alkali silicate is technically anhydrous sodium silicate, and wherein the temperature is above about 150° C.

8. The process of preparing a solid sodium sub-silicate which comprises mixing together solid subdivided caustic soda and solid subdivided technically anhydrous sodium silicate containing a ratio of $SiO_2$ to $Na_2O$ greater than 1 to 1, in such molecular proportions that the $Na_2O$ content of the mixture is greater than the $SiO_2$ content, and in the absence of water exceeding 7% of the total weight of the sodium silicate and caustic soda; heating the mixture to a temperature below the fusion point of caustic soda sufficient to cause a vigorous reaction between the caustic soda and sodium silicate and the liberation of sufficient water to form in a short time a sub-silicate, the water content of which does not substantially exceed that of a monohydrate; and during said reaction stirring the mass until a solid granular product is obtained.

9. The process of preparing a solid sodium sub-silicate which comprises mixing together solid subdivided caustic soda and solid subdivided technically anhydrous sodium silicate containing a ratio of $SiO_2$ to $Na_2O$ greater than 1 to 1, in such molecular proportions that the $Na_2O$ content of the mixture is greater than the $SiO_2$ content, and in the absence of an appreciable amount of water; heating the mixture to a temperature above about 150° C. and below the fusion point of caustic soda sufficient to cause a vigorous reaction between the caustic soda and sodium silicate and the liberation of sufficient water to form in a short time a sub-silicate, the water content of which does not substantially exceed that of a monohydrate; and during said reaction stirring the mass until a solid granular product is obtained.

10. The process of preparing a solid sodium sub-silicate which comprises mixing together solid subdivided caustic soda and solid subdivided technically anhydrous sodium silicate containing a ratio of $SiO_2$ to $Na_2O$ greater than 1 to 1, in such molecular proportions that the $Na_2O$ content of the mixture is greater than the $SiO_2$ content, an in the absence of water; heating the mixture to a temperature above about 150° C. and below the fusion point of caustic soda sufficient to cause a vigorous reaction between the caustic soda and sodium silicate to form in a short time a sub-silicate; and during said reaction stirring the mass until a solid granular product is obtained.

11. The process of preparing a solid technically anhydrous sodium sub-silicate which comprises mixing together solid subdivided caustic soda and a solid subdivided technically anhydrous sodium silicate containing a ratio of $SiO_2$ to $Na_2O$ greater than 1 to 1, in such molecular proportions that the $Na_2O$ content of the mixture is greater than the $SiO_2$ content, and in the absence of water exceeding 7% of the total weight of the sodium silicate and caustic soda; heating the mixture to a temperature below the fusion point of caustic soda, while stirring, sufficient to cause a vigorous reaction between the caustic soda and sodium silicate and the liberation of sufficient water to form in a short time a sub-silicate, the water content of which does not substantially exceed that of a monohydrate; and further heating the product at a temperature above 300° C. and below the melting point thereof to cause a further reaction and the conversion of the product into the technically anhydrous true sub-silicate product.

12. The process of preparing a solid technically anhydrous sodium sub-silicate which comprises mixing together solid subdivided caustic soda and solid subdivided technically anhydrous sodium silicate containing a ratio of $SiO_2$ to $Na_2O$ greater than 1 to 1, in such molecular proportions that the $Na_2O$ content of the mixture is greater than the $SiO_2$ content, and in the absence of an appreciable amount of water; heating the mixture to a temperature above about 150° C. and below the fusion point of caustic soda, while stirring, sufficient to cause a vigorous reaction between the caustic soda and sodium silicate and the liberation of sufficient water to form in a short time a sub-silicate, the water content of which does not substantially exceed that of a monohydrate; and further heating the product at a temperature above 300° C. and below the melting point thereof to cause a further reaction and the conversion of the product into the technically anhydrous true sub-silicate product.

13. The process of claim 12 wherein the ratio of $Na_2O$ to $SiO_2$ in the mixture is approximately 1.5 to 1 and wherein the product formed is substantially $Na_6Si_2O_7$.

14. The process of claim 12 wherein the ratio of $Na_2O$ to $SiO_2$ in the mixture is approximately 2 to 1 and wherein the product formed is substantially $Na_4SiO_4$.

15. The process of preparing a solid technically anhydrous sodium sub-silicate which comprises mixing together solid subdivided caustic soda and solid subdivided technically anhydrous sodium silicate containing a ratio of $SiO_2$ to $Na_2O$ greater than 1 to 1, in such molecular proportions that the $Na_2O$ content of the mixture is greater than the $SiO_2$ content, and in the absence of water; heating the mixture to a temperature above about 150° C. and below the fusion point of caustic soda, while stirring, sufficient to cause a vigorous reaction between the caustic soda and sodium silicate to form in a short time a sub-silicate; and further heating the product at a temperature above 300° C. and below the melting point thereof to cause a further reaction and the conversion of the product into the technically anhydrous true sub-silicate product.

16. The process of claim 15 wherein the ratio of $Na_2O$ to $SiO_2$ in the mixture is approximately 1.5 to 1 and wherein the product formed is substantially $Na_6Si_2O_7$.

17. The process of claim 15 wherein the ratio of $Na_2O$ to $SiO_2$ in the mixture is approximately 2 to 1 and wherein the product formed is substantially $Na_4SiO_4$.

18. The process of preparing a solid technically anhydrous sodium sub-silicate which comprises mixing together solid subdivided caustic soda and solid subdivided technically anhydrous sodium silicate containing a ratio of $SiO_2$ to $Na_2O$ greater than 1 to 1, in such molecular proportions that the $Na_2O$ content of the mixture is greater than the $SiO_2$ content, and in the absence of water exceeding 7% of the total weight of the sodium silicate and caustic soda; heating the mixture to a temperature below the fusion point of caustic soda sufficient to cause a vigorous reaction between the caustic soda and sodium silicate and the liberation of sufficient water to form in a short time a sub-silicate, the water content of which does not substantially exceed that of a monohydrate; during said reaction stirring the mass until a solid granular product is obtained; and further heating the product at a temperature above 300° C. and below the melting point thereof to cause a further reaction and the conversion of the product into the technically anhydrous true sub-silicate product.

19. The process of preparing a solid sodium sub-silicate which comprises mixing together solid subdivided caustic soda and solid subdivided hydrated sodium silicate, which is substantially soluble in hot water, containing a ratio of $SiO_2$ to $Na_2O$ greater than 1 to 1, in such molecular proportions that the $Na_2O$ content of the mixture is not less than the $SiO_2$ content; and heating said mixture consisting only of said caustic soda and sodium silicate to a temperature below the fusion point of said caustic soda and of said sodium silicate, while stirring, sufficient to cause the reaction between the caustic soda and sodium silicate to form in a short time a sub-silicate.

20. The process of preparing a solid sodium metasilicate which comprises mixing together solid subdivided caustic soda and solid subdivided hydrated sodium silicate, which is substantially soluble in hot water, containing a ratio of $SiO_2$ to $Na_2O$ greater than 1 to 1, in such molecular proportions that the $Na_2O$ content of the mixture is substantially equal to the $SiO_2$ content; and heating said mixture consisting only of said caustic soda and sodium silicate to a temperature below the fusion point of said caustic soda and of said sodium silicate, while stirring, sufficient to cause the reaction between the caustic soda and sodium silicate to form in a short time sodium metasilicate.

WALTER S. RIGGS.
CLARENCE W. BURKHART.